US005466415A

United States Patent [19]

Brundage et al.

[11] Patent Number: 5,466,415

[45] Date of Patent: Nov. 14, 1995

[54] EXTRUSION OF METAL HONEYCOMBS

[75] Inventors: Kevin R. Brundage; Lawrence S. Rajnik, both of Corning, N.Y.

[73] Assignee: Corning Incorporated, Corning, N.Y.

[21] Appl. No.: 326,380

[22] Filed: Oct. 20, 1994

[51] Int. Cl.[6] .............................. B22F 7/02; B29C 47/00

[52] U.S. Cl. .............................. 419/67; 419/5; 419/7; 419/35; 419/61; 425/110

[58] Field of Search .............................. 428/116, 546; 419/5, 7, 35, 61, 67; 425/110, 133.1

[56] References Cited

U.S. PATENT DOCUMENTS

| | | | |
|---|---|---|---|
| 4,075,270 | 2/1978 | Cunningham | 264/209 |
| 5,194,719 | 3/1993 | Merkel et al. | 219/552 |
| 5,219,509 | 6/1993 | Cocchetto et al. | 264/177.12 |
| 5,240,396 | 8/1993 | Bremyer | 425/133.1 |

*Primary Examiner*—Donald P. Walsh
*Assistant Examiner*—John N. Greaves
*Attorney, Agent, or Firm*—K. van der Sterre

[57] ABSTRACT

Thick-skinned extruded metal honeycomb structures, and a method and apparatus for making them, are disclosed wherein a plasticized powder metal extrusion batch is extruded though a die assembly comprising a die and annular mask, the mask having a central outlet for extrusion of the skin and honeycomb core and an extrudate reservoir adjacent the central outlet, the die and mask cooperating to form a skinforming gap fed by the die and by the extrudate reservoir, such that batch material supplied from the reservoir and directly from the die combines to form a thickened outer skin which is integral with, and resistant to separation from, the honeycomb core.

12 Claims, 1 Drawing Sheet

FIG. 1
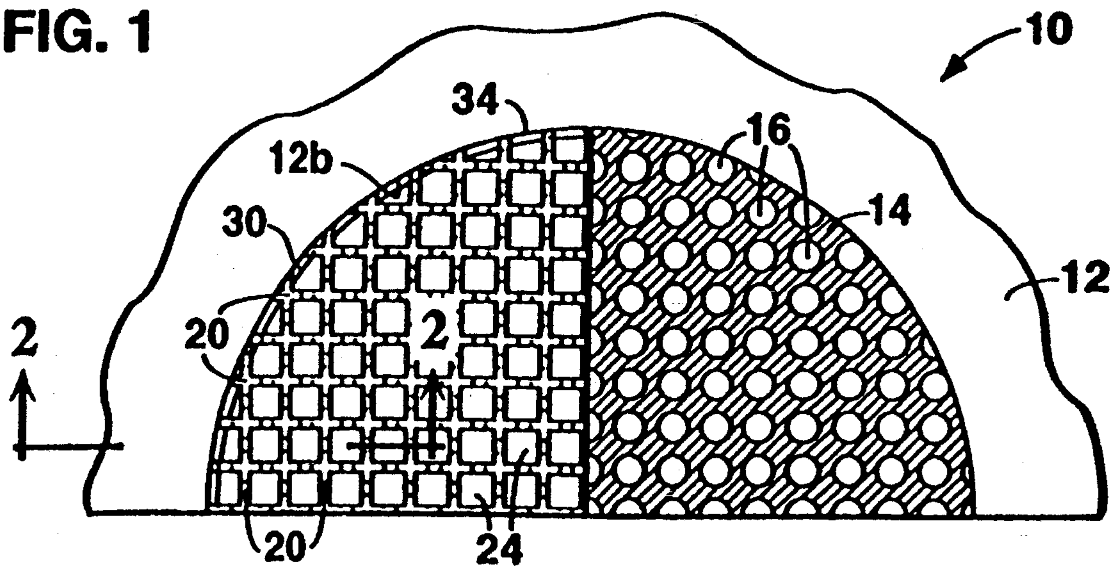
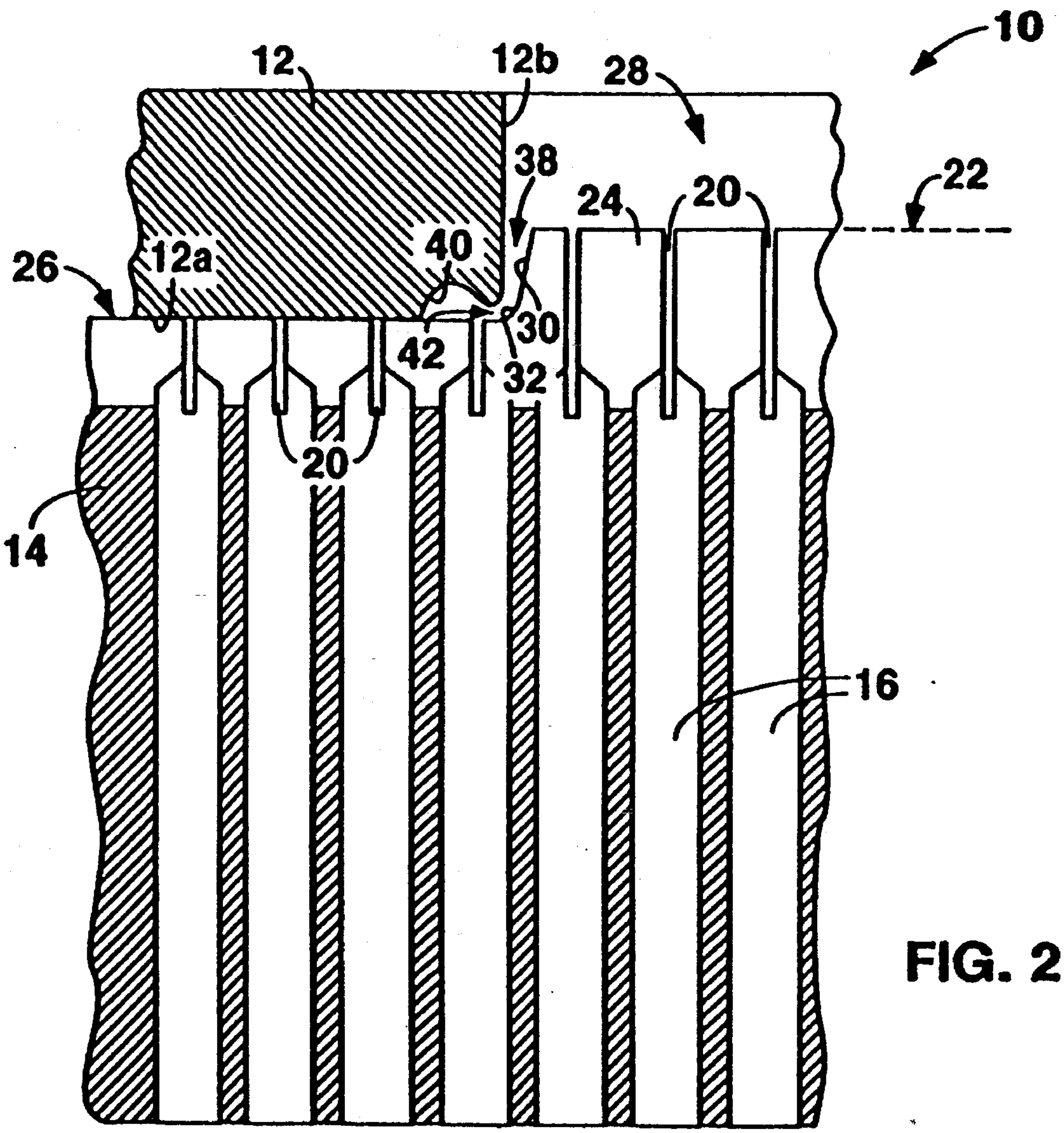
FIG. 2

EXTRUSION OF METAL HONEYCOMBS

BACKGROUND OF THE INVENTION

The present invention relates to metal honeycombs useful as fluid heaters or heated catalyst supports for automotive emissions control catalysts. More particularly the invention relates to improved electrically conductive metal honeycombs for the fabrication of such devices, and to methods for making them.

One approach to meeting the impending low and ultra-low automotive exhaust emission control standards for pollution control is the use of a fast-starting catalytic conversion unit such as an electrically heated catalyst (EHC). Electrically heated catalysts, which generally employ an electrically activated heater at a location supporting or otherwise proximate to a conventional emissions control catalyst, can be of various designs.

One recently developed design, based on an electrically conductive metal honeycomb made by the extrusion and sintering of selected metal alloy powders, has proven particularly effective for this application. Examples of extruded metal honeycombs for this application are disclosed, for example, in U.S. Pat. No. 5,194,719 to Merkel et al.

The manufacturing methods used to make extruded metal honeycombs impose a number of structural limitations on the product. For example, to achieve the uniform extrusion of metal powder batches of extrudable consistency through honeycomb extrusion dies of conventional design, the cell walls, outer skin, and other structural parts of the honeycomb have had to be of roughly the same wall thickness. This is because variations in wall thickness tend to be accompanied by variations in extrusion rate, the latter typically leading to undesirable distortions in the cell structure of the resulting extruded green honeycomb bodies.

These limitations have made it difficult to extrude metal honeycombs in forms which lend themselves to the subsequent application, in a mechanically rugged configuration, of contact electrodes for the application of electrical power to the honeycomb. The thin honeycomb cell walls needed for high electrical resistivity and efficient heating do not provide sufficient supporting structure for the firm mounting of the electrodes.

Another difficulty with thin-walled metal honeycombs relates to the tendency of the peripheral wall structure to abrade or otherwise damage mechanical or electrical insulation material used to isolate and support the honeycombs in the exhaust system. This is particularly harmful if electrical insulation between the honeycomb and its grounded support or container is thereby damaged.

One prior art solution to these problems has involved a process step known as "edge fill". In this process a plasticized powdered metal filler material is used to fill in selected channels located at or near the edge of the extruded honeycomb shape. Upon consolidation of an edge-filled honeycomb the filled channels form an edge or skin which can be smoothed as necessary, and to which electrodes for powering the honeycomb can be successfully attached. However, while edge filling effectively addresses some of the problems relating to the use of thin-walled metal honeycombs for electrically heated catalyst use, it represents a time-consuming and expensive process.

In the manufacture of ceramic honeycomb bodies by extrusion, a number of different modifications to the extrusion dies have been proposed to help with the formation of desirable skin configurations on the extruded ware. These include U.S. Pat. No. 4,075,270 describing scalloped mask constructions, and U.S. Pat. No. 5,219,509 relating to die structures providing means for transitioning extrudate flow for the honeycomb skin to smoothly follow the direction of extrusion of the honeycomb core.

In the polymer extrusion art, methods and apparatus have been developed for co-extruding core and skin polymers of differing composition employing an extruder providing separate feed streams for the core and skin materials. However, as illustrated by U.S. Pat. No. 5,240,396, this approach requires a relatively complex die structure in order to maintain separate feed streams for the extruded materials.

Therefore, a method for increasing the outer skin or wall thickness of extruded metal honeycombs for use as electrical heaters without the need for supplemental edge-filling or other complex processing equipment for the honeycombs would be of significant economic benefit.

SUMMARY OF THE INVENTION

The present invention provides an improved extruded metal honeycomb configuration of unitary structure for use in electrical fluid heating applications. The improved honeycomb configuration is a one-piece configuration featuring a relatively thick extruded skin portion integral with a co-extruded thin-walled honeycomb core of the same composition.

The thick skin and thin-walled core portions are extruded using simplified tooling which facilitates the extrusion of a unitary product from a single feed stream of plasticized extrusion batch material without distortion. Advantageously, the core and skin regions are sufficiently well knitted, and the green extruded body therefore sufficiently homogeneous in composition and microstructure, that drying and sintering can be accomplished without causing objectionable separation of the core and skin portions of the body. Thus a strong, unitary, thick-skinned extruded metal honeycomb is provided.

The extrusion of a thin-walled metal honeycomb body with integral thick skin in accordance with the invention is carried out using extrusion apparatus comprising, in combination, an extrusion die and an annular mask for the die. Conventionally, the extrusion die has an inlet face provided with feedholes for introducing metal powder batch material and an outlet face having a plurality of intersecting discharge slots communicating with the feedholes and opening onto the outlet face for discharging metal powder extrudate outwardly from the outlet face in the form of a honeycomb body.

The annular mask used in combination with the die has a central opening and is positioned so that its annular lower or blocking surface covers a peripheral outlet portion of the die outlet face. The die outlet face includes a raised main outlet portion extending into the central opening in the annular mask. A space between the edge of the mask opening and the raised main outlet portion of the outlet face provides a skinforming gap for shaping and controlling the flow of the extruded material to form a skin on the honeycomb core.

The annular mask includes an annular channel in its lower or blocking surface, spaced outwardly from and encircling the central opening. That channel forms an annular extrudate reservoir between the mask and the peripheral portions of the outlet face partially covered by the mask. The extrudate reservoir is in communication with the main portion of the outlet face through a reservoir gap or opening between the inner edge of the mask and the covered portion of the outlet face.

In the method of forming a honeycomb body with the apparatus above described, the extruded body with its honeycomb core and thickened outer skin layer is extruded as a unit from a single feedstream of a plasticized powder metal batch material fed to the die. As is conventional, the cell walls of the core are formed by the intersecting discharge slots opening onto the central or main outlet portion of the outlet face on the die.

For the formation of the thickened skin portion of the extruded body, plasticized batch material discharged outwardly from discharge slots near the peripheral portion of the die is discharged into two adjoining but distinct regions of the die. The first region is the annular extrudate reservoir in the blocking surface of the mask, and the second region is the skinforming gap formed between the outlet face and the edge of the mask annulus.

In the course of the extrusion process, batch material collected in the extrudate reservoir is subsequently discharged toward the main outlet portion of the die though the reservoir gap located between the peripheral outlet face portion of the die and the mask. Exiting the reservoir gap, this batch material enters the skinforming gap where it combines with batch material directly entering the skinforming gap from the discharge slots directly supplying that gap.

The result of the joining or combination of the batch material from these two die regions is that a thickened integral outer skin layer is formed on the honeycomb core during the extrusion process. This layer is co-extruded and integral with the core, yet has a thickness at least twice, and more typically 5–10 or more times, the thickness of the cell walls of the core.

The use of the combination of the mask with annular reservoir and the die with a skinforming gap of proper size has been found surprisingly successful in producing extruded metal honeycombs with skins of substantial thickness without damage to the underlying honeycomb structure. Thus thick-skinned honeycombs with cores substantially free of cell or cell wall distortions and other core defects can efficiently be produced. No conventional skinforming die has yet been identified which has been found effective to achieve similar extrusion results.

BRIEF DESCRIPTION OF THE DRAWINGS

The invention may be further understood by reference to the drawings wherein:

FIG. 1 is a fragmental plan view of a honeycomb extrusion die showing the general disposition of the mask, feedholes and discharge slots therein; and FIG. 2 is a fragmental cross-sectional view in elevation of a preferred extrusion die assembly of the present invention.

DETAILED DESCRIPTION

A specific example of die apparatus suitable for producing an extruded metal honeycomb body in accordance with the invention is schematically illustrated in the drawings. As shown in the two Figures, die apparatus 10 includes a peripheral skinforming mask 12 combined with a die body 14, the latter constituting the honeycomb core extrusion section of the apparatus.

As is conventional for honeycomb extrusion dies, the die body has an inlet face provided with a plurality of feedholes 16, these feedholes communicating at one end with the die inlet face falling on broken line 18 and at the other end with a plurality of interconnected discharge slots 20. Slots 20 are open toward and form a slotted outlet face on the die, the main portion of which falls on the extension of broken line 22.

Referring more particularly to the outlet face on 22, it can be seen that the open interconnected discharge slots 20 form a plurality of pins 24 on the outlet face of the die. These pins act to form channels or cells in extrudable material being discharged through the slots, thus forming the discharging material into a channeled green honeycomb shape wherein the material forms the cell walls of the honeycomb.

As best seen in FIG. 2 of the drawing, to provide the required skinforming capability in this die a peripheral portion of the slotted outlet face is relieved to form a lowered secondary or peripheral outlet face portion 26 surrounding a central or main outlet face portion 28. Main portion 28 extends outwardly or protrudes somewhat above the relieved peripheral portion 26 of the outlet face as shown in FIG. 2 of the drawing.

Peripheral outlet face portion 26 and main outlet face portion 28, differing in height, are bridged by a ledge or connecting surface 30, generally perpendicular to the connected main and secondary outlet face portions and referred to as a first skinforming surface. Paralleling the inner edge of mask 12 around the periphery of main outlet face portion 28 of the die, first skinforming surface 30 is of generally cylindrical or, more preferably, frustoconical configuration. In the preferred embodiment best seen in FIG. 2 of the drawing, skinforming surface 30 angles slightly inwardly toward the die center axis, which is the center of main outlet face portion 28. The angle of surface 30 imparts a frustoconical shape to the protruding portion of the die body forming surface portion 28.

Typically, surface 30 as well as sections of peripheral outlet face portion 26 will be intersected by outlet face discharge slots 20, although in the case of outlet face portion 26 these slots will be at least partially masked. Also in the preferred configurations, skinforming surface 30 will typically curve smoothly into peripheral outlet face portion 26 of the die, rather than intersecting sharply or abruptly with that surface. Thus junction 32 between surfaces 26 and 30 is smooth rather than angled.

To assemble the die apparatus, skinforming mask 12 is positioned over the die outlet face portions configured as above described. As shown in the drawings, mask 12 is an annular plate having a central opening 34 slightly larger than main outlet face portion 28 of the die but corresponding in shape thereto. Mask 12 is affixed to die body 14 such that it largely overlies peripheral outlet face portion 26 of the die. As so positioned mask 12 presents a blocking surface **12*a* which, for those regions of outlet face portion 26 covered by the mask, prevents the discharge of extrudable batch material from partially covered slots 20**.

Mask 12 performs a dual purpose in the operation of the die. First, mask surface **12*b* bounding the central opening in the mask, which is a surface generally perpendicular to the outlet face portions of the die and generally parallel to first skinforming surface 30 on the die body, provides a second skin-forming surface for the die. This second skinforming surface 12*b*, being spaced a predetermined distance away from first skin-forming surface 30 and operating in conjunction therewith, defines a skin-forming gap 38 between the first and second skinforming surfaces. The width of gap 38** in part determines the thickness of the skin which is formed on a honeycomb body shaped by extrusion of a powdered metal batch material through the die and mask assembly.

In addition to providing the second skinforming surface, mask 12 is configured to form an extrudate reservoir 40 for accumulating powdered metal batch material to be extruded through the die assembly. Reservoir 40 is formed as an annular space between the mask and the peripheral outlet face portion, and is configured to open into or communicate with skinforming gap 38 in order to increase the supply of batch material to the gap.

Reservoir 40 is directly supplied with batch material by those portions of extrusion slots 20 extending into the annular space that are not covered by the flat surfaces of mask 12. Batch material accumulating in reservoir 40 is then delivered to skinforming gap 38 through a reservoir gap 42 formed between mask 12 and die outlet face portion 26.

The flow of batch material from the reservoir into skinforming gap 38 can be determined by pre-selecting the size of reservoir 40 and reservoir gap 42. To achieve effective skinforming performance for powdered metal honeycomb extrusion, however, the depth of the annular recess or channel forming reservoir 40 (as measured from the deepest point in the annular recess to the point on surface 26 closest to that point) will generally exceed the size of reservoir gap 42. Most preferably, the depth of reservoir 40 will be at least two times the size of gap 42.

The extrusion of a honeycomb body from a moldable metal powder batch using a die such as described above can be carried out using moldable metal powder batches of conventional composition known in the art. Neither the composition of the metal powders used to compound the batches nor the specific vehicle components used to impart plasticity to the extrusion batches are thought to be critical to the extrusion of honeycomb bodies with thick outer skin layers in accordance with the invention.

The increases in skin thickness obtainable through the use of the die apparatus described are substantial and could not have been predicted based on the configuration of the apparatus alone. Typically, carrying out the manufacture of metal honeycombs using conventional extrusion dies, honeycomb outer skin thicknesses are only of approximately the same order as the cell wall thicknesses, i.e., 100–150 micrometers (0.004–0.006 inches).

Skin thicknesses at least twice and more typically 5 to 10 or more times greater than these wall thickness can provide substantial improvements in both the manufacturability and the functional performance of metal honeycombs made by extrusion processes. As the following illustrative example demonstrates, such enhanced skin thicknesses are readily obtainable using the extrusion methods and apparatus herein described.

EXAMPLE

A metal powder extrusion batch is prepared by mixing metal and oxide powders and binder components together in proportions suitable for the fabrication by extrusion of an electrically conductive metallic honeycomb body. The powder component of the extrusion batch is a powder mixture comprising, in parts by weight, about 74.25 parts Fe metal powder, 23.33 parts Cr-30Al alloy powder, 1.66 parts Cr powder, 0.5 parts Y203 oxide powder, and 0.25 Fe-20B alloy powder. All starting powders have average particles sizes in the range of 15–25 micrometers, except for the Fe powder which has an average particle size of about 5 micrometers The above metal and oxide powders are mixed by dry blending to form a homogeneous blend, and the powder mixture is then combined with a vehicle for extrusion. The vehicle used comprises a combination of methyl cellulose, oleic acid, and water, these being added to the powder mixture with blending in the order above given, and in proportions such that the extrusion batch includes about 4% methyl cellulose, 1% oleic acid, and 20% water by weight after blending.

The extrusion batch thus provided, after de-aerating in a pug mill, is extruded through a honeycomb extrusion die to provide a green honeycomb body with channels of square cross-section. The extrusion die employed has a round cross-section and channel size and spacing such as to provide approximately 68 square channels or cells per cm2 (about 440 cells/in2) of honeycomb cross-sectional area in the honeycomb, as measured after drying and sintering the green body to a metal honeycomb product. The channel walls in the sintered honeycomb product are about 130 micrometers in thickness.

To continuously form an integral, thick outer skin on the core of the green honeycomb as it is being extruded, the die used is provided with skinforming surfaces and an associated extrudate reservoir for supplying the skinforming gap, these elements being substantially of the configuration shown in the drawing. To control the thickness of the extruded skin, the skinforming gap provided for the die is about 2 mm (0.079 inches) in width and the reservoir gap is about 400 micrometers (0.015 inches) in width.

The skin provided on the green honeycomb body extruded using this die is smooth, uniform, and substantially free of gaps, tears, or other defects. Further, it is sufficiently thick as extruded to provide an integral outer metal skin of approximately 1.5 mm (0.062 inches) thickness on the surface of the sintered honeycomb. This thickness is more than 10 times the thickness of skin layers produced using conventional extrusion dies.

The use, as in the foregoing Example, of apparatus incorporating both a skinforming gap and an extrudate reservoir in communication with that gap is considered critical to the invention. The formation of a skin of the requisite thickness while avoiding cell distortion and other forming defects in peripheral portions of the extruded honeycomb has not yet been achieved utilizing other extrusion die designs.

In one comparative experiment, a green honeycomb was extruded from a powder metal batch essentially identical in composition to the batch of Example 1, but using a different extrusion die design. In that experiment, the extrusion die included an extrudate reservoir but no skinforming gap, an approach successfully developed for the production of ceramic honeycomb bodies and illustrated, for example, in U.S. Pat. No. 3,947,214.

Although useful for ceramic processing, this approach was not successful in producing metal honeycombs from metal powder batches, due to extensive defects generated in the honeycomb structures during the extrusion process. While sufficient increases in outer wall thickness were observed during extrusion, the resulting products were rendered unacceptable due to distortion and/or collapse of peripheral cells adjacent to the thickened skin.

Similarly, a further comparative experiment using the same powder metal batch, but employing a die of a type used for ceramic honeycomb skinforming, proved unsuccessful. In that experiment, the die used included a skinforming gap, but did not include a peripheral skinforming reservoir. This type of design, similar to that shown in U.S. Pat. No. 5,089,203, did not cause defects in honeycomb cell structure, but a skin of sufficient thickness could not be successfully formed.

As previously noted, the advantages of a metal honeycomb structure with adequate skin thickness in accordance with the foregoing Example are several. In the case of electrical heating applications, for example, electrical leads must be connected to the honeycomb for power lead attachment. The preferred technique for attaching these electrodes is stud welding, but this technique requires material on the surface of the part to be of sufficient thickness to tolerate the welding process. For the kinds of electrode materials and configurations presently employed, the minimum surface thickness has been determined to be about 0.030 inches.

The provision of a thick skin of relatively uniform thickness over the entire extruded honeycomb structure provides a further advantage in terms of manufacturing flexibility. Thus, this characteristic facilitates electrode attachments or other structural additions at essentially any desired location about the periphery of the part.

Finally, the durability of green extruded ware during the interval between the time of extrusion and the time of sintering is significantly improved in thick-skinned parts. This aids in reducing the incidence of misshapen or out-of-round ware at the extrusion stage, and also increases the durability of dried but unsintered parts, so that shaping operations previously reserved for sintered ware can now be more economically carried out on dried ware prior to sintering.

We claim:

1. Apparatus for the extrusion of a metal honeycomb body comprising, in combination:

an extrusion die and an annular mask attached to the die;

the extrusion die having an inlet face provided with feedholes for introducing metal powder batch material and an outlet face having a plurality of intersecting discharge slots communicating with the feedholes and opening onto the outlet face for discharging metal powder extrudate outwardly from the outlet face in the form of a honeycomb body;

the outlet face comprising a central main outlet portion and an annular peripheral outlet portion surrounding the main outlet portion, the main outlet portion extending beyond the peripheral outlet portion in the direction of discharge;

a first skinforming surface on the outlet face formed by a ledge surface connecting the peripheral outlet face portion with the outwardly extended main outlet face portion;

the annular mask having a central opening and a masking surface, the masking surface being positioned against and partially covering the peripheral outlet face portion and the main outlet face portion extending into the central opening of the mask;

a second skinforming surface formed by a surface portion of the mask bounding the central opening, the second skinforming surface being separated from the first skinforming surface by a skinforming gap;

an annular extrudate reservoir in the mask, formed by an annular recess in the masking surface, which recess is positioned radially outwardly of but proximate to the central opening; and a reservoir gap comprising an annular gap between the peripheral outlet face portion of the die and an annular portion of the masking surface located radially inwardly of the extrudate reservoir, said reservoir gap providing an opening between the extrudate reservoir and the skinforming gap.

2. Apparatus in accordance with claim 1 wherein the first skinforming surface is intersected by discharge slots.

3. Apparatus in accordance with claim 2 wherein the first skinforming surface is of cylindrical configuration.

4. Apparatus in accordance with claim 2 wherein the first skinforming surface is of frustoconical configuration.

5. Apparatus in accordance with claim 4 wherein the first skinforming surface angles inwardly toward a center axis traversing the center of the main outlet portion of the outlet surface of the die.

6. Apparatus in accordance with claim 2 wherein the first skinforming surface joins the peripheral outlet portion at an intersection which is smoothly curved.

7. Apparatus in accordance with claim 1 wherein the extrudate reservoir is a channel in the blocking surface of the mask having a depth at least twice the magnitude of the reservoir gap.

8. A method for making a metal honeycomb body comprising a honeycomb core and an outer skin layer by extruding a plasticized powder metal batch material through an extrusion die and annular mask, the honeycomb core having cell walls formed by a plurality of intersecting discharge slots opening onto a main outlet portion of an outlet face on the die, and the annular mask having a central opening for extrusion of the core and a blocking surface for blocking portions of the discharge slots extending from the main outlet portion into a peripheral portion of the outlet face covered by the mask, wherein:

batch material discharged outwardly from discharge slots near the mask blocking surface is discharged both into an annular extrudate reservoir in the blocking surface of the mask and into a skinforming gap between the outlet face and the mask; and batch material collected in the extrudate reservoir is discharged into the skinforming gap though a reservoir gap between the peripheral outlet face portion and the mask;

batch material discharged through the reservoir gap combines with batch material discharged into the skinforming gap to form a thickened integral outer skin layer on the honeycomb core, such thickened outer skin layer having a thickness at least twice the thickness of the cell walls of the core.

9. A method in accordance with claim 8 wherein the skinforming gap is formed by a juxtaposition of a raised section on the main outlet portion of the outlet face and an edge surface on the central opening of the mask.

10. A method in accordance with claim 9 wherein the main outlet portion of the outlet face protrudes into the central opening in the mask and the skinforming gap is formed by a juxtaposition of an edge surface of the main outlet face portion and the edge surface on the central opening of the mask.

11. A method in accordance with claim 10 wherein reservoir gap and skinforming gap are of a size sufficient to provide a thickened outer skin layer at least 5 times the thickness of the cell walls of the core.

12. A method in accordance with claim 11 wherein the cell walls have a thickness not exceeding about 0.010 inches and the outer skin has a thickness of at least about 0.030 inches.

* * * * *